US012565761B2

(12) United States Patent
Bös

(10) Patent No.: US 12,565,761 B2
(45) Date of Patent: Mar. 3, 2026

(54) DEVICE AND METHOD FOR SAFE INTERACTION OF UNMANNED LOADING MACHINES AND MANNED VEHICLES AND PERSONS

(71) Applicant: LIEBHERR-WERK BISCHOFSHOFEN GMBH, Bischofshofen (AT)

(72) Inventor: Manuel Bös, Kuchl (AT)

(73) Assignee: LEIBHERR-WERK BISCHOFSHOFEN GMBH, Bischofshofen (AT)

( * ) Notice: Subject to any disclaimer, the term of this patent is extended or adjusted under 35 U.S.C. 154(b) by 342 days.

(21) Appl. No.: 18/257,262

(22) PCT Filed: Dec. 13, 2021

(86) PCT No.: PCT/EP2021/085498

§ 371 (c)(1),
(2) Date: Jun. 13, 2023

(87) PCT Pub. No.: WO2022/128921

PCT Pub. Date: Jun. 23, 2022

(65) Prior Publication Data

US 2024/0035256 A1     Feb. 1, 2024

(30) Foreign Application Priority Data

Dec. 15, 2020    (DE) ..................... 10 2020 133 610.1

(51) Int. Cl.
*E02F 9/26*     (2006.01)
*G05D 1/00*     (2024.01)
(52) U.S. Cl.
CPC ........... *E02F 9/261* (2013.01); *G05D 1/0055* (2013.01)

(58) Field of Classification Search
CPC ....... G05D 1/0055; G05D 1/0214; G05D 1/02
See application file for complete search history.

(56) References Cited

U.S. PATENT DOCUMENTS

| | | | |
|---|---|---|---|
| 7,337,056 B2 * | 2/2008 | Arai ...................... | B60W 30/16 |
| | | | 180/170 |
| 9,908,534 B2 | 3/2018 | Desnoyer et al. | |

(Continued)

FOREIGN PATENT DOCUMENTS

| | | | | |
|---|---|---|---|---|
| DE | 102019201698 | * | 8/2020 | ............... G05D 1/02 |
| DE | 102019201698 A1 | | 8/2020 | |

(Continued)

OTHER PUBLICATIONS

ISA European Patent Office, International Search Report Issued in Application No. PCT/EP2021/085498, Apr. 5, 2022, WIPO, 4 pages.

*Primary Examiner* — Mussa A Shaawat
(74) *Attorney, Agent, or Firm* — McCoy Russell LLP

(57) ABSTRACT

The present invention relates to a device for the safe interaction of unmanned loading machines and manned vehicles and persons, comprising: at least one spatial zone for the autonomous or teleoperated operation of an unmanned loading machine, wherein the zone is designed to adopt different states, wherein, in a first state of the zone, the autonomous or teleoperated operation of the unmanned loading machine is not allowed in the zone, in a second state of the zone, the unmanned or teleoperated operation of the unmanned loading machine is allowed in the zone, the device is designed to adopt the first state while or before a manned vehicle or a person enters the zone, and the device is designed to adopt the second state while or after a manned vehicle or a person leaves the zone.

14 Claims, 5 Drawing Sheets

(56)                References Cited

U.S. PATENT DOCUMENTS

| | | | | |
|---|---|---|---|---|
| 10,025,315 | B2 * | 7/2018 | Klinger | G05B 13/024 |
| 2004/0105747 | A1 * | 6/2004 | Mikrut | E02F 3/342 |
| | | | | 414/685 |
| 2006/0195237 | A1 * | 8/2006 | Makela | B60T 7/22 |
| | | | | 701/50 |
| 2007/0101872 | A1 | 5/2007 | Kasel | |
| 2009/0043462 | A1 * | 2/2009 | Stratton | E02F 9/26 |
| | | | | 701/50 |
| 2012/0136524 | A1 * | 5/2012 | Everett | G05D 1/0291 |
| | | | | 701/25 |
| 2014/0067187 | A1 * | 3/2014 | Ferguson | B60W 60/0011 |
| | | | | 701/28 |
| 2016/0117929 | A1 * | 4/2016 | Chan | G08G 5/59 |
| | | | | 701/3 |
| 2017/0121944 | A1 * | 5/2017 | Kajita | E02F 9/2242 |
| 2017/0193827 | A1 * | 7/2017 | Dill | G05D 1/106 |
| 2017/0229025 | A1 * | 8/2017 | Klinger | H04B 7/0617 |
| 2018/0170369 | A1 * | 6/2018 | Mitchell | B62D 1/02 |
| 2018/0210443 | A1 * | 7/2018 | Matsuzaki | G05D 1/0088 |
| 2019/0187742 | A1 * | 6/2019 | Hettegger | G05G 9/047 |
| 2020/0150687 | A1 * | 5/2020 | Halder | G05D 1/648 |
| 2020/0265731 | A1 * | 8/2020 | Lev | G08G 5/32 |
| 2020/0310442 | A1 * | 10/2020 | Halder | G05D 1/0221 |
| 2020/0326713 | A1 * | 10/2020 | Spielman | E02F 9/2045 |
| 2021/0080948 | A1 * | 3/2021 | Franco | G05D 1/0033 |
| 2021/0080965 | A1 * | 3/2021 | Starr | G05D 1/692 |
| 2021/0107540 | A1 * | 4/2021 | Lucas | G08G 1/0116 |
| 2021/0124359 | A1 * | 4/2021 | Wei | E02F 9/2054 |
| 2025/0198129 | A1 * | 6/2025 | Gerth | E02F 5/32 |

FOREIGN PATENT DOCUMENTS

| | | |
|---|---|---|
| SE | 379027 B | 9/1975 |
| WO | 2020206426 A1 | 10/2020 |

* cited by examiner

DEVICE AND METHOD FOR SAFE INTERACTION OF UNMANNED LOADING MACHINES AND MANNED VEHICLES AND PERSONS

CROSS REFERENCE TO RELATED APPLICATIONS

The present application is a U.S. National Phase of International Application No. PCT/EP2021/085498 entitled "DEVICE AND METHOD FOR THE SAFE INTERACTION OF UNMANNED LOADING MACHINES AND MANNED VEHICLES AND PERSONS," and filed on Dec. 13, 2021. International Application No. PCT/EP2021/085498 claims priority to German Patent Application No. 10 2020 133 610.1 filed on Dec. 15, 2020. The entire contents of each of the above-listed applications are hereby incorporated by reference for all purposes.

TECHNICAL FIELD

The present invention relates to a device and method for safe interaction of unmanned loading machines, in particular construction machines, such as dump trucks, wheel loaders, dozers (crawler loaders or bulldozers), diggers, cable excavators or the like with manned vehicles and persons.

BACKGROUND AND SUMMARY

In open-cast mining as well as on large construction sites or in gravel works, loading machines often perform one and the same activity over a longer period of time.

For example, much of a wheel loader operator's working day may consist only of picking up bulk material from a bulk pile on a construction site and loading it onto a dump truck. Similarly to in the automotive sector, however, with the progress of technological development, unmanned driving of such a loading machine is favoured, as the machines can then be used independently of the physical presence of an operator. For example, such a loading machine can be operated from a remote workstation, wherein the operator of such a loading machine is not exposed to the harsh environmental conditions in which the loading machine is used. Alternatively, it is also possible for the loading machine to operate fully autonomously, eliminating the need for a remotely positioned operator.

The problem here is that there are high safety requirements for the teleoperated or autonomous operation of loading machines, which cannot be achieved by the sensors of an autonomous or teleoperated loading machine alone. For example, it is common for industrial robots to be operated only when it is ensured that no operators or other personnel can be endangered by the actions of such a robot.

Since an accident with a manned vehicle or person also represents a very high risk potential with unmanned loading machines, such as wheel loaders, it is also of overriding importance here to exclude such accidents or to reduce the probability of them.

Therefore, it is the object of the present invention to resolve the above-mentioned issues and to provide a method and/or a device for the safe interaction of unmanned loading machines and manned vehicles or persons.

This is achieved with a device according to claim 1 and a method according to claim 12. Respective advantageous embodiments of the present invention are realised in the dependent claims.

According to the invention, a device for the safe interaction of unmanned loading machines and manned vehicles and persons is provided that comprises at least one spatial zone for the autonomous or teleoperated operation of an unmanned loading machine. The device is characterised in that the zone is designed to adopt different states, wherein, in a first state of the zone, the autonomous or teleoperated operation of the unmanned loading machine is not allowed in the zone, in a second state of the zone, the autonomous or teleoperated operation of the unmanned loading machine is allowed in the zone, the device is designed to adopt the first state while or before a manned vehicle or a person enters the zone, and the device is designed to adopt the second state while or after a manned vehicle or a person leaves the zone.

By providing a zone that can adopt different states, an unmanned loading machine is deactivated when a manned vehicle or person enters or is in a zone assigned for the unmanned loading machine. By the unmanned loading machine ceasing its activity, the likelihood of a collision or other unwanted action by the unmanned loading machine is avoided.

Only after a manned vehicle or person has left the zone again or there are no more manned vehicles or persons in the zone, does the unmanned loading machine resume its interrupted action and continues its work.

It can thus be provided that the unmanned loading machine is continuously informed about the status of the zone assigned to it via a data transmission unit, so that a corresponding reaction can take place immediately in the event of a status change of the associated zone.

The predictable behaviour of the unmanned loading machine is also advantageous for the operator of manned vehicles or persons, as they can trust that when entering the zone assigned to the unmanned loading machine, the latter will interrupt its work, so that consideration for a perceived erratic travel path of the unmanned loading machine is not necessary.

This is also advantageous in the event that the unmanned loading machine is controlled remotely from a remote location (so-called teleoperated loading machine), as there is regularly a certain latency between the commands at the remote workplace of an operator and the associated execution at the teleoperated loading machine, so that a quick reaction capability required to prevent a dangerous situation is not always guaranteed.

The device according to the invention reduces the risk of an accident or of endangering the physical integrity of an operator of a manned vehicle or of a person, so that at the same time the regulatory approval requirements for the implementation of such a solution are also achieved significantly more easily.

According to an optional modification of the present invention, it can be provided that the spatial zone defines a working area for an unmanned loading machine, which it cannot leave, wherein in particular the zone is implemented as a real, physical barrier and/or as an electronic or sensor-monitored barrier, preferably in the form of geofence technology, light barriers, radio transponders, ripcords and/or ground pressure sensors.

The unmanned loading machine can thus be equipped with a positioning system, for example a GPS system, in order to reliably determine its position. The zone that the unmanned loading machine is not allowed to leave is stored in the positioning system so that it can be permanently checked by comparing the current situation of whether or not the unmanned loading machine continues to operate in the zone assigned to it.

However, the invention can also comprise the boundary of the zone not only being stored virtually in a positioning system, but also being drawn by actual spatially-physically formed boundaries. Alternatively or additionally, other technologies may be used to detect the unmanned loading machine leaving its assigned zone. For example, ripcords may be attached to the boundary, which are then disconnected when the unmanned loading machine is about to cross the zone boundary. This disconnection of the cord is detected and leads, for example, to an immediate standstill of the unmanned loading machine. For example, a radio signal from the ripcord system (or another solution described, such as GPS geofence) can be sent to the unmanned loading machine to trigger an emergency stop. It is also possible to work with ground pressure sensors which, if a force acting on them is exceeded, conclude that the unmanned loading machine has passed over them and also ensure that the unmanned loading machine is switched off or stopped immediately.

According to an advantageous embodiment of the present invention, it can be provided that a spatial separating device is provided on an edge of the zone, which the unmanned loading machine cannot pass over.

Since a spatial separating device offers the most protection regardless of unforeseeable technical faults, it is still preferred by many users. Finally, even in the event of malfunctions that are not actually considered possible, a danger caused by the unmanned loading machine acting outside the zone is prevented.

Thus, for a bulk material transfer across the zone boundary, it can be provided that the unmanned loading machine should, however, act with one of its implements behind the edge outside of the zone, preferably in order to cooperate with a manned vehicle arranged outside of the zone, e.g. to load this directly with a bulk material.

Often, however, the interaction of an unmanned loading machine with a manned vehicle is required, such that a separating wall positioned at the edge of the zone is provided, wherein the unmanned loading machine can approach the side of the separating wall facing the zone and a manned vehicle can be positioned on the side facing away from it. By means of the working tools arranged on the unmanned loading machine, it is then possible, for example, for direct interaction to take place between the unmanned loading machine and the manned vehicle. For example, an unmanned wheel loader can lift its bucket over the physically formed separating wall and dump the bulk material inside on the side facing away from the zone. If a manned dump truck is now positioned at the corresponding location, this causes the unmanned wheel loader to load the dump truck.

According to an optional modification of the present invention, it can be provided that the spatial separating device is a conveying device, in particular a ramp, for guiding bulk material delivered by the unmanned loading machine or by the manned vehicle, preferably wherein a manned vehicle for picking up or delivering the bulk material can be positioned at the part of the conveying device arranged outside of the zone. Thus, it can be provided that the conveying device runs across the boundary of the zone.

In order now to further increase safety and prevent the direct tipping of bulk material from, for example, an unmanned wheel loader into the truck body of a manned dump truck, a conveying device can be provided at the boundary of a zone, which runs from the inside of the zone to the outside of the zone. This conveying device can, for example be a ramp or a conveyor belt, such that an unmanned loading machine deposits bulk material onto this ramp or conveyor belt and it is thereby transported to an area outside of the zone, from where it is then picked up by the manned vehicle. The invention also comprises the opposite case in which the bulk material is introduced into the zone from outside of the zone, for example by a manned vehicle dumping bulk material directly into the zone or placing it on a conveying device and then introducing it from there into the inside of the zone by means of the conveying device.

Preferably, according to the invention, it can further be provided that manned vehicles or persons can only enter or leave the spatial zone/at locks in order to prevent undetected crossings of manned vehicles or persons into or out of the zone. The locks can be designed to detect the approach or passage of manned vehicles or persons and to change the status of the zone accordingly.

It can further be provided according to the invention that the zone has a third state, in which the automatic operation of the unmanned loading machine is also allowed if a manned vehicle or a person is present in the spatial zone and an operator of the manned vehicle or the person is located at a safe location and releases the autonomous or teleoperated operation of the unmanned loading machine via a release device, wherein the release device is preferably arranged in a fixed position at the safe location. As well as the active release of the unmanned machine by the human, this could also happen automatically, e.g. if it is detected by sensors that the person or the driver of the manned vehicle has arrived at the safe place of retreat.

It is often advantageous for a smooth workflow if an unmanned loading machine can interact directly with a manned vehicle. For example, tipping a bulk material directly into the truck body of a dump truck is particularly time-saving if the bulk material pile to be deposited on the dump truck is not far from the current position of the dump truck to be loaded. Therefore, it can be advantageous if a manned dump truck can be brought to an advantageous position within the zone and loaded there by an unmanned wheel loader. However, in order not to endanger the operator of the dump truck, it can be provided that the unmanned wheel loader only operates when the operator is in a safe location. This applies accordingly to another person. A safe location could be, for example, an area outside of the zone that the unmanned wheel loader cannot reach. However, it can also be provided that a safe location is provided inside the zone to protect the operator from a possible malfunction of the unmanned wheel loader. Accordingly, if the operator of the dump truck is in such a safe location, for example a bunker-like enclosure, the state of the zone can be changed to the third state via a release device, such that the unmanned loading machine can start loading the dump truck. However, there is no risk to the health of the operator or any other person, as they are in a safe location while the unmanned loading machine is operating.

For example, a position determination unit of the operator or person can be provided as a release device, so that it is ensured that the operator/person is not in a potential danger zone when the unmanned loading machine is active. A radio transponder, a commercially available mobile phone or even a stationary terminal can be used as a positioning unit, which, when the terminal is actuated, signals to the device that the operator/person is in the immediate vicinity of it and that the unmanned loading machine may now become active again. Furthermore, it is conceivable that a sensory monitoring of the safe place of retreat detects the presence of the operator/person and provides the release. This can be realised, for example, by cameras, laser scanners or other environmental sensors.

Accordingly, it can thus be provided that a safe location, to be occupied by the operator of the manned loading machine or another person and where they can activate the release device is outside of the spatial zone or can also be inside the spatial zone if there is a place of retreat within the zone which the operator or the person can go to in order to be sufficiently protected from the unmanned loading machine.

In addition, according to the present invention it can be provided that a plurality of adjacent zones is provided, each of which can individually and independently adopt one of a plurality of different states.

Providing a plurality of adjacent zones allows a very high degree of flexibility in the interaction of unmanned loading machines and manned vehicles or persons, in particular in the case of large-area premises (open-cast mines or the like).

For example, with finer segmentation of zones, it is possible for approaching manned vehicles to cause unmanned loading machines to stop entering or leaving zones adjacent to the manned loading machine, allowing a continuous, uninterrupted workflow for the manned vehicle operator.

Thus, in an advantageous way it is provided that no spatial separating elements or transfer opportunities are provided between the adjacent zones, such that in corresponding states of the adjacent zones an unmanned loading machine can pass from one zone into the other zone.

According to a further design of the present invention, it can be provided that the unmanned loading machine is a construction machine for earthmoving work, preferably a wheel loader or front-end loader, and the manned vehicle is a construction machine with a truck body, preferably a tiltable truck body, such as a dump truck.

The present invention further relates to a method for the safe interaction of unmanned loading machines and manned vehicles or persons, preferably a method for operating a device according to any one of the variants listed above, wherein in the method a spatial zone is defined for the autonomous or teleoperated operation of an unmanned loading machine, the zone is able to e.g., adopt different states, wherein, in a first state of the zone, the autonomous or teleoperated operation of the unmanned loading machine is not allowed in the zone, in a second state of the zone, the autonomous or teleoperated operation of the unmanned loading machine is allowed in the zone, the first state is adopted while or before a manned vehicle or a person enters the zone, and the second state is adopted while or after a manned vehicle or a person leaves the zone.

By providing the zone with different states, a hazard to operators of a manned vehicle or persons is reduced, because when a manned vehicle enters the zone assigned to an unmanned loading machine, the unmanned loading machine is no longer moved, so that it poses no or only a very low hazard.

Thus, it can be provided that the zone has a third state, in which the autonomous or teleoperated operation of the unmanned loading machine is also allowed if a manned vehicle or a person is present in the spatial zone and an operator of the manned vehicle or the person is located at a safe location and releases the autonomous or teleoperated operation of the unmanned loading machine via a release device, wherein the release device is preferably arranged in a fixed position at the safe location.

As already explained above, determining whether the operator or person is in a safe location can also be carried out using a position sensing system associated with the operator, such as a GPS tracker. This can also be built into a commercially available mobile phone and/or wearable, so that the position of the operator/person can be determined in a simple way and without the operator/person having to do anything themselves. The mobile phone and/or another portable end device, such as a wearable, report when the safe place of retreat in the zone has been reached or when the zone has been left. Alternatively, a stationary sensor system, for example a camera with downstream evaluation unit, can report the presence of the operator/person in the safe area.

Furthermore, according to an optional variant of the method, it can be provided that a plurality of adjacent zones are provided, each of which can individually and independently adopt one of a plurality of different states, such that when two adjacent zones are in corresponding states, an autonomous loading machine can pass from one zone to the other zone.

If there is a plurality of adjacent zones, it is possible to prevent the case that an unmanned loading machine stops for a longer period of time. To increase the productivity of this machine, it can be transferred to an adjacent zone before a manned vehicle enters, so that it can continue to carry out activities there. This prevents it from remaining idle in the zone where the manned vehicle enters.

It can further be provided that wherein in response to the impending change of a first zone from the second state to the first state an unmanned loading machine located in the zone passes to an adjacent zone that is in the second state.

The features mentioned with respect to the method according to the invention can also be features of the device according to the invention and vice versa.

At this point it is pointed out that the terms "a" and "one" do not necessarily refer to exactly one of the elements, although this is a possible embodiment, but can also denote a plurality of the elements. Similarly, the use of the plural also includes the presence of the element in question in the singular and, conversely, the singular also includes several of the elements in question.

BRIEF DESCRIPTION OF THE FIGURES

Further features, details and advantages of the invention can be seen in the following description of the figures. In the figures.

DETAILED DESCRIPTION

Figure 1:
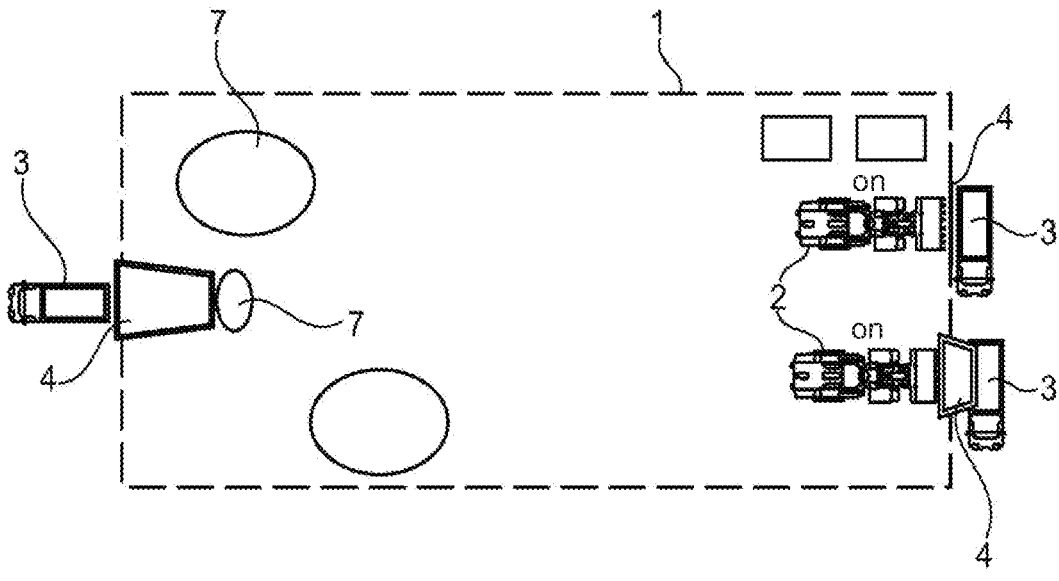
FIG. 1: shows a schematic representation of the present invention, in which loading of unmanned loading machines to manned vehicles takes place across the zone boundary, as well as possible implementations for spatial separation along the zone boundary.
Figure 1:
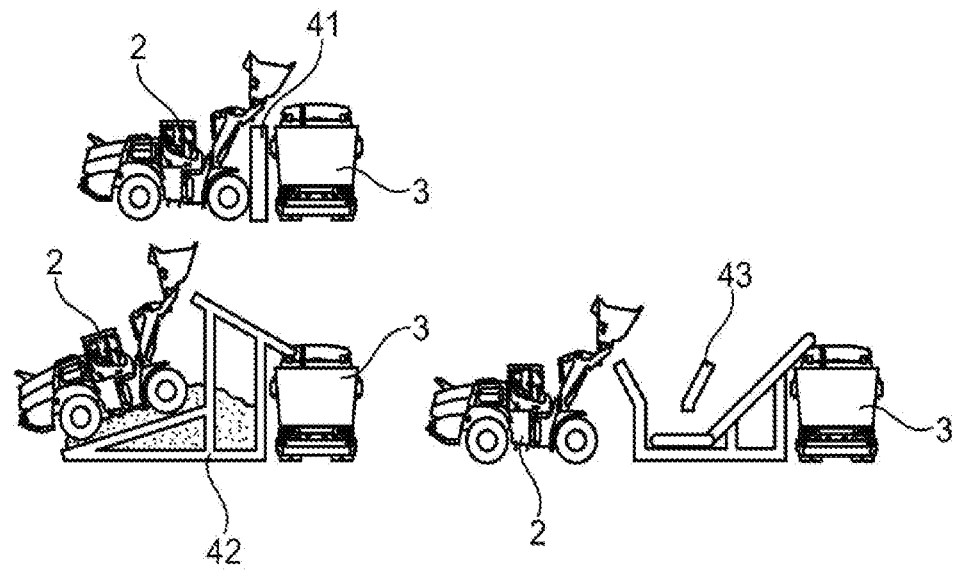

FIG. 1 shows a schematic representation of the present invention, in which loading of unmanned loading machines to manned vehicles takes place across the zone boundary, as well as possible implementations for spatial separation along the zone boundary, The zone 1 can be seen shown with a dashed line, in which two unmanned loading machines 2 are arranged. There is also a plurality of bulk material piles 7 arranged inside the zone 1, which can be moved by means of the unmanned loading machine 2. Typically, the unmanned loading machine 2 is an autonomous or teleoperated wheel loader that is used to handle the bulk material 7. A plurality of separating walls 4 is provided at the edge of the zone 1, and a manned vehicle 3 is arranged on its side facing away from the zone 1. The loading of bulk material 7 from the unmanned loading machine 2 onto a receiving surface of the manned vehicle 3 is thereby carried out over the separating wall 4 or by depositing the bulk material 7 on the separating wall 4 and a gravitational sliding or motor-driven conveying onto the loading surface of the manned dump truck 3. There are special ramps 42 and hoppers with conveyor belt 43 for this purpose.

The unmanned working machine 2 is still inside the zone 1 when the load is transferred and does not leave it. An additional feeling of safety for the operator of the manned vehicle 3 is provided by the solid separating wall 4, which is arranged between the unmanned loading machine and the manned vehicle.

Different embodiments of this separating wall 4 are shown in the lower half of FIG. 1, which can be implemented by a simple separating wall 41, for example. In this configuration of the separating wall 41, the unmanned wheel loader 2 will drive close to the separating wall 41 and dump the bulk material 7 deposited in its bucket directly into the receiving region of the manned dump truck 3.

In the case of indirect loading, for example, a ramp 42 or a feed hopper with subsequent conveyor system 43 runs across the boundary of the zone 1. This means that there is no direct interaction between the unmanned loading machine 2 and the manned vehicle 3, which further reduces any potential danger to the operator of the manned vehicle 3. The further advantage of the implementation with the feed hopper and the conveyor belt 43 is that the working rhythm of the unmanned loading machine 2 is not tied to the presence of a manned vehicle 3, but it can continue to work independently of the presence of the manned vehicle 3. The bulk material flow therefore takes place across the boundaries of zone 1 here, so that the unmanned loading machine 2 does not have to move out of the zone 1 assigned to it.

Figure 2:
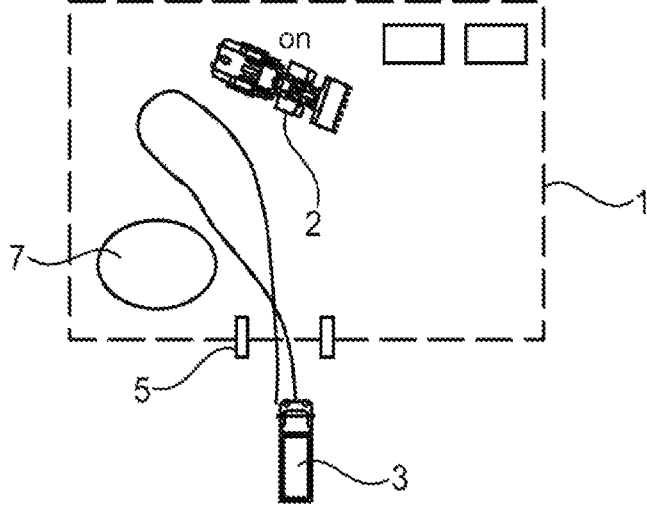
FIG. 2: shows a schematic representation of a basic concept according to the invention in a sequence of three images.
Figure 2:
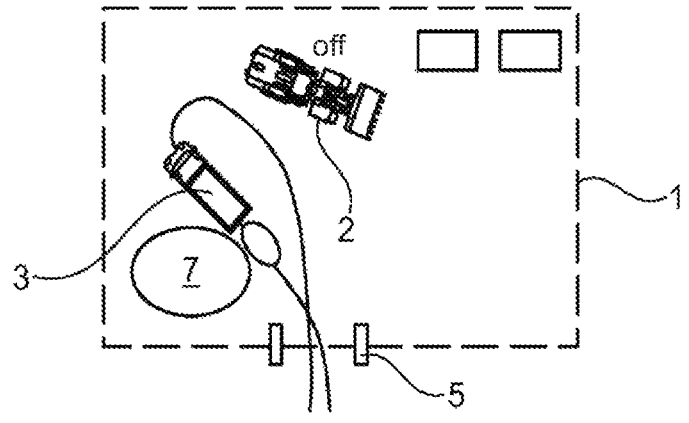
Figure 2:
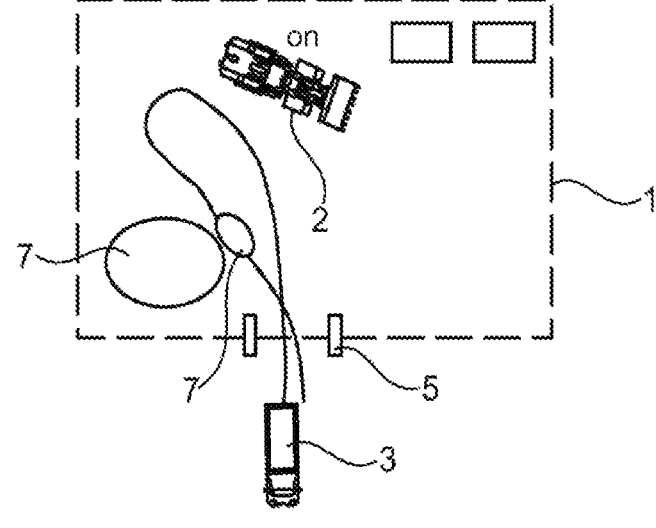

FIG. 2 shows a change of state of zone 1 in a sequence of three images. In the top image, the zone 1 is activated and the unmanned loading machine 2 is active. It is therefore teleoperated or performs its work fully autonomously as long as a manned vehicle 3 has not yet passed through the lock 5 or has approached it if it falls below a minimum distance. The middle image shows the state in which the manned vehicle 3 has entered the zone 1, i.e. has passed the lock 5. When passing through the lock 5 or an imminent process of passing through the lock 5, the state of the zone 1 changes so that the unmanned loading machine 2 located therein is no longer active. It is then possible for the manned vehicle 3 to carry out its work to be done in the zone 1 without being disturbed or even endangered by an active unmanned loading machine 2.

In the bottom image of FIG. 2, the state of the zone 1 is then again such that the unmanned loading machine 2 is active again. The manned vehicle 3 has left the zone 1, i.e.

has driven out of the zone 1 through the lock 5, so that continued operation of the unmanned loading machine 2 no longer poses a hazard.

The change of state of the zone 1 depending on the positioning of the manned vehicle 3 ensures that there is no simultaneous operation of a manned vehicle 3 equipped with an operator in the vicinity of an unmanned loading machine 2, thus avoiding potentially dangerous situations.

Figure 3:
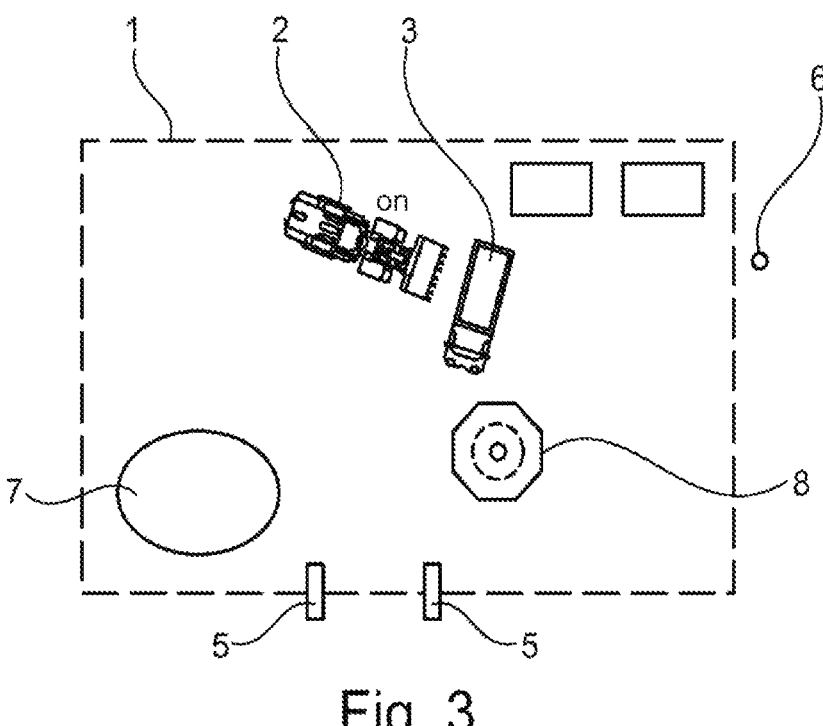
FIG. 3: shows a schematic representation for a possible variant for direct interaction of an unmanned wheel loader with a manned dump truck.

FIG. 3 shows a further development of the present invention, in which interaction of an unmanned loading machine 2 with a manned vehicle 3 whose operator is located at a safe location 8 is also possible. To allow direct interaction between the unmanned and manned loading machine, it is necessary that the operator 6 of the manned vehicle 3 is in a safe location. For example, leaving the zone 1 is an option, or one can define a place of retreat 8 defined as a safe location in the zone 1. This place of retreat 8 is designed in such a way that even in the event of a possible malfunction of the unmanned loading machine 2, there is no danger to the operator 6 located at the safe place of retreat. The advantage of a place of retreat 8 located in the zone 1 is the increased efficiency, as the operator 6 of the manned vehicle 3 only has to cover a short distance compared to leaving the zone 1 until the unmanned loading machine can be activated.

If the operator 6 is in a safe location (i.e. at the safe place of retreat 8 inside the zone 1 or outside of the zone 1), the operator can change the state of the zone 1 so that the unmanned loading machine 2 may become active even though a manned vehicle 3 (left by the operator) is inside the zone 1. To accomplish this, a release device may be provided inside the safe place of retreat 8 to allow the corresponding change of state of the zone 1. Alternatively or additionally, a position determination unit of the operator 6 can also be provided, which changes the state accordingly when it is ensured that the operator 6 is no longer inside the zone 1 or has reached the safe place of retreat 8.

Figure 4:
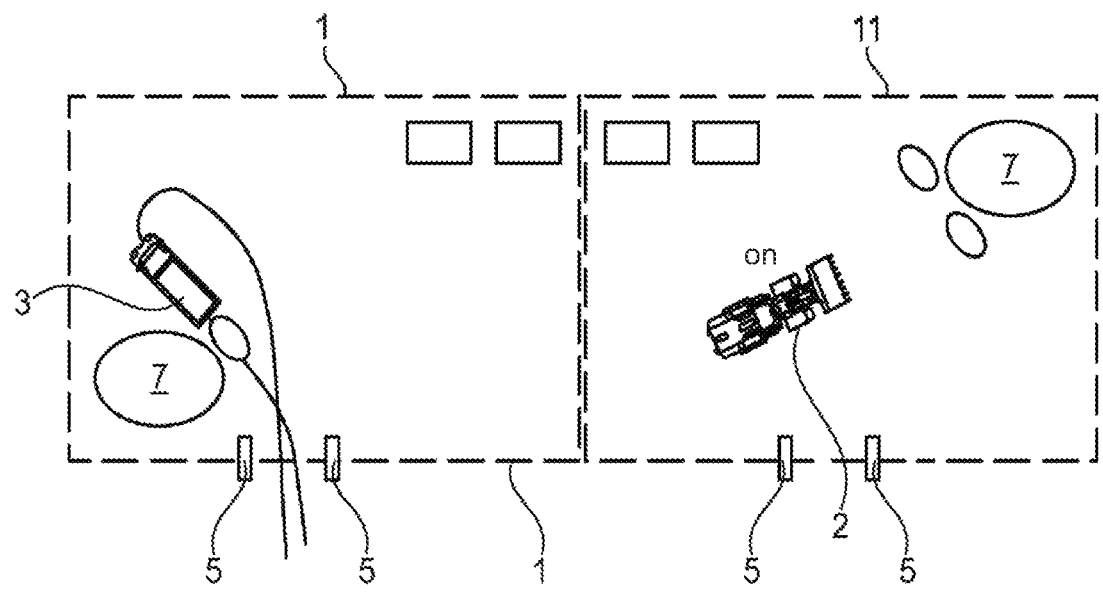
FIG. 4: shows a schematic representation of a plurality of adjacent zones, which can adopt different states.

FIG. 4 shows the presence of two adjacent zones 1, 11. By providing a plurality of adjacent zones 1, 11, the flexibility and efficiency of unmanned loading machines 2 at one location is noticeably increased. If the operation site is segmented into a plurality of adjacent zones 1, 11, it is possible to react to the imminent entry of a manned vehicle 3 into one of the plurality of zones 1, 11 by having the unmanned loading machine 2 enter the zone not targeted by the manned vehicle 3. In the present representation, the unmanned loading machine 2 works in the zone 11, which is not entered by the manned vehicle 3. This allows the unmanned loading machine 2 to carry out an activity there so that it does not simply remain inactive in the zone 1 in which the manned vehicle 3 has entered. The sensors of the lock 5 can detect an approaching manned vehicle 3 such that the unmanned loading machine 2 can initiate a change to an adjacent zone 11.

Figure 5:
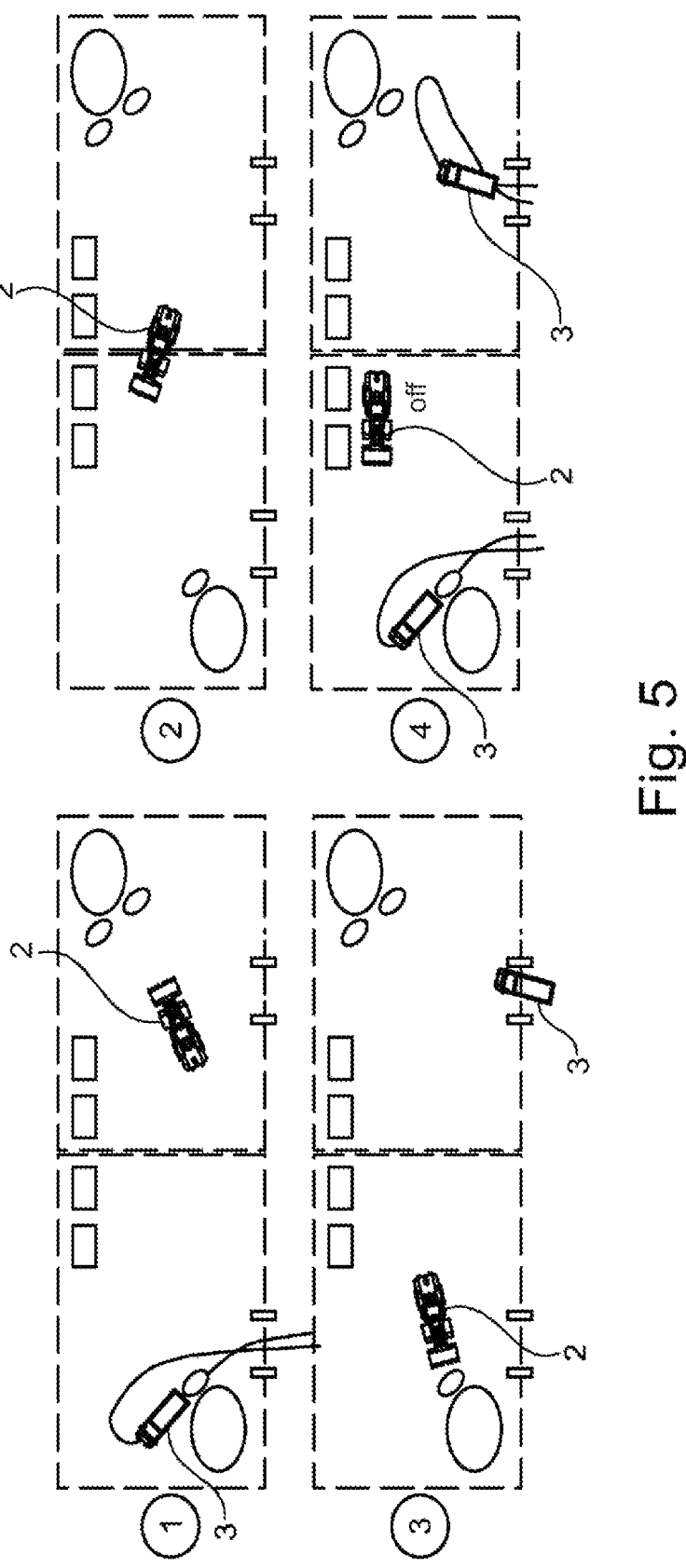
FIG. 5: shows a schematic representation for the presence of a plurality of adjacent zones, as well as some of the possible different states of the adjacent zones.

FIG. 5 shows four different illustrations of different states of two adjacent zones. In a first illustration, one of the two zones is occupied by a manned vehicle 3, such that the unmanned loading machine 2 can still be active in the other zone.

In the second illustration of this figure, a transfer of the unmanned loading machine 2 from the right zone to the left zone takes place, such that the right zone is now ready for a manned vehicle 3 to enter.

This is then exactly what happens in the third illustration, where now the unmanned loading machine 2 can be active in the left zone, whereas the right zone would have been blocked by the entry of the manned vehicle 3.

In the fourth illustration, it is then the case that a manned vehicle 3 also enters the left zone, wherein a manned vehicle 3 is in the right zone at the same time. As the unmanned loading machine 2 now has no option of being able to change to a zone not occupied by a manned vehicle 3, there is no other possibility than to be switched to an inactive state.

Figure 6:
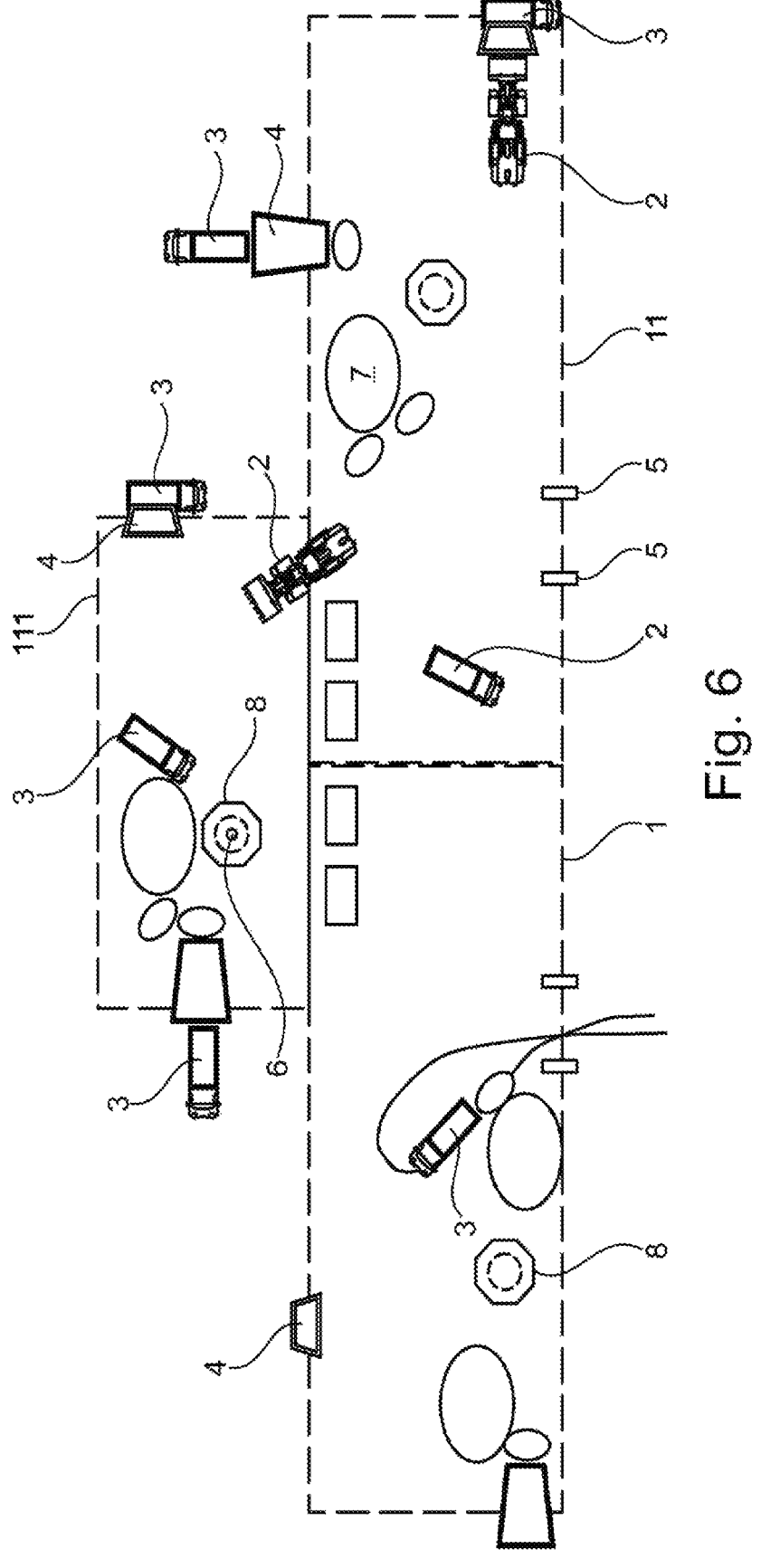
FIG. 6: shows a schematic representation of a further embodiment of the device according to the invention.

FIG. 6 shows a representation of a total of three adjacent zones 1, 11, 111; however, it is understood by the person skilled in the art that the present invention is not limited to three zones. In this figure, a combination of all the features of the present invention discussed above can be seen, wherein the lower left zone 1 is a manual zone into which a manned loading machine 3 has entered. All unmanned loading machines 2 are arranged in the other two zones 11, 111, such that they can carry out their work tasks there. In the zone 111, the state to be considered is precisely that in which the operator 6 is in a safe place of retreat 8 in the zone 111, and the operation of unmanned loading machines 2 is possible despite the presence of a manned vehicle 3. In addition, different separating walls 4, 41, 42, 43 can be seen in the edge region of the zones 1, 11, 111, which are used for transferring bulk material 7 to a position outside of a respective zone 1, 11, 111.

The invention claimed is:

1. Device for the safe interaction of unmanned loading machines and manned vehicles and persons, comprising:
at least one spatial zone for the autonomous or teleoperated operation of an unmanned loading machine, wherein
the zone is designed to adopt different states, wherein,
in a first state of the zone, the autonomous or teleoperated operation of the unmanned loading machine is not allowed in the zone,
in a second state of the zone, the unmanned or teleoperated operation of the unmanned loading machine is allowed in the zone,
the device is designed to adopt the first state while or before a manned vehicle or a person enters the zone, and
the device is designed to adopt the second state while or after a manned vehicle or a person leaves the zone, and
wherein manned vehicles or persons can only enter or leave the spatial zone at locks in order to prevent undetected crossings of manned vehicles or persons into the zone or out of the zone.

2. Device according to claim 1, wherein the spatial zone defines a working area for an unmanned loading machine, which it cannot leave, wherein the zone is implemented as a real, physical barrier and/or as an electronic or sensor-monitored barrier.

3. Device according to claim 1, wherein a spatial separating device is provided on an edge of the zone, which the unmanned loading machine cannot pass over.

4. Device according to claim 3, wherein the unmanned loading machine can, however, act with one of its implements behind the edge outside of the zone.

5. Device according to claim 3, wherein the spatial separating device is a conveying device.

6. Device according to claim 4, wherein the zone has a third state, in which the automatic operation of the unmanned loading machine is also allowed if a manned vehicle or a person is present in the spatial zone and an operator of the manned vehicle or the person is located at a safe location and releases the automatic operation of the unmanned loading machine via a release device.

7. Device according to claim 6, wherein a safe location, to be occupied by the operator of the manned vehicle or the person and where they can activate the release device is outside of the spatial zone or can also be inside the spatial zone if there is a place of retreat within the zone which the operator or the person can go to in order to be sufficiently protected from the unmanned loading machine.

8. Device according to claim 1, wherein a plurality of adjacent zones is provided, each of which can individually and independently adopt one of a plurality of different states.

9. Device according to claim 8, wherein no spatial separating elements are provided between the adjacent zones, such that in corresponding states of the adjacent zones an unmanned loading machine can pass from one zone into the other zone.

10. Device according to claim 1, wherein the unmanned loading machine is a construction machine for earthmoving work, and the manned vehicle is a construction machine with a truck body.

11. Method for the safe interaction of unmanned loading machines and manned vehicles or persons, wherein in the method:
a spatial zone is defined for the autonomous or teleoperated operation of an unmanned loading machine,
the zone is able to adopt different states, wherein,
in a first state of the zone, the autonomous or teleoperated operation of the unmanned loading machine is not allowed in the zone,
in a second state of the zone, the autonomous or teleoperated operation of the unmanned loading machine is allowed in the zone,
the first state is adopted while or before a manned vehicle or a person enters the zone, and
the second state is adopted while or after a manned vehicle or a person leaves the zone, and
wherein manned vehicles or persons can only enter or leave the spatial zone at locks in order to prevent undetected crossings of manned vehicles or persons into the zone or out of the zone.

12. Method according to claim 11, wherein the zone has a third state, in which the automatic operation of the unmanned loading machine is also allowed if a manned vehicle or a person is present in the spatial zone and an operator of the manned vehicle or the person is located at a safe location and releases the automatic operation of the unmanned loading machine via a release device.

13. Method according to claim 11, wherein a plurality of adjacent zones are provided, each of which can individually and independently adopt one of a plurality of different states, such that when two adjacent zones are in corresponding states, an autonomous loading machine can pass from one zone to the other zone.

14. Method according to claim 13, wherein in response to the impending change of a first zone from the second state to the first state in which an unmanned loading machine is located, the unmanned loading machine passes to an adjacent zone that is in the second state.

* * * * *